US012452193B1

United States Patent
Krivit et al.

(10) Patent No.: US 12,452,193 B1
(45) Date of Patent: Oct. 21, 2025

(54) AUTOMATIC SPECULATION CONFIGURATION MANAGEMENT

(71) Applicant: CLOUDFLARE, INC., San Francisco, CA (US)

(72) Inventors: Alex Krivit, Denver, CO (US); Syed Suleman Ahmad, Austin, TX (US); Matthew Gumport, Seattle, CA (US); Connor Harwood, Los Angeles, CA (US); Thomas Hatzopoulos, Chicago, IL (US); Jee Hoon Kim, Santa Clara, CA (US); Young Keun Park, Folsom, CA (US); Anthony Raymond Rabia Seure, Vert-Saint-Denis (FR); Avani Gadani, San Francisco, CA (US); William Woodhead, London (GB)

(73) Assignee: CLOUDFLARE, INC., San Francisco, CA (US)

(*) Notice: Subject to any disclaimer, the term of this patent is extended or adjusted under 35 U.S.C. 154(b) by 0 days.

(21) Appl. No.: 18/896,714

(22) Filed: Sep. 25, 2024

(51) Int. Cl.
*H04L 47/83* (2022.01)
*H04L 47/78* (2022.01)

(52) U.S. Cl.
CPC ............ *H04L 47/83* (2022.05); *H04L 47/788* (2013.01)

(58) Field of Classification Search
CPC .............................. H04L 47/83; H04L 47/788
See application file for complete search history.

(56) References Cited

U.S. PATENT DOCUMENTS

| 7,068,998 | B2 | 6/2006 | Zavidniak |
| 8,000,314 | B2 | 8/2011 | Brownrigg et al. |
| 8,233,471 | B2 | 7/2012 | Brownrigg et al. |
| 8,363,663 | B2 | 1/2013 | Smith et al. |
| 8,402,085 | B2 | 3/2013 | Mccanne et al. |
| 8,625,496 | B2 | 1/2014 | Brownrigg et al. |
| 8,761,008 | B2 | 6/2014 | Meier et al. |
| 8,762,490 | B1* | 6/2014 | Roskind .............. H04L 67/5681 709/224 |

(Continued)

OTHER PUBLICATIONS

Akamai Techdocs, "Prerender pages with Speculation Rules", available online at <https://techdocs.akamai.com/ion/docs/prerender-pages-with-speculation-rules>, 2024, 3 pages.

(Continued)

*Primary Examiner* — Joe Chacko
(74) *Attorney, Agent, or Firm* — NICHOLSON DE VOS WEBSTER & ELLIOTT LLP

(57) ABSTRACT

Automatic speculation configuration management is described. An intermediary server receives a request from a client. The resource is retrieved from the origin server, where the resource includes link(s) to other resource(s). The intermediary server generates and transmits a response that includes a header that references a speculation configuration for prefetching at least one of the other resource(s). The intermediary server receives a request for the speculation configuration from the client. The intermediary server generates and transmits a response to the client that includes the speculation configuration. The intermediary server receives a prefetching request from the client for one of the resources indicated in the speculation configuration, retrieves that resource, and transmits a response to the client with that resource.

21 Claims, 5 Drawing Sheets

(56) References Cited

U.S. PATENT DOCUMENTS

| | | | |
|---|---|---|---|
| 8,787,246 | B2 | 7/2014 | Brownrigg |
| 8,982,856 | B2 | 3/2015 | Brownrigg |
| 9,178,829 | B2 | 11/2015 | Meier et al. |
| 9,241,044 | B2 | 1/2016 | Shribman et al. |
| 9,853,834 | B2 | 12/2017 | Meier et al. |
| 9,992,250 | B2 | 6/2018 | Giladi |
| 10,261,938 | B1 | 4/2019 | Jenkins et al. |
| 10,491,703 | B1 | 11/2019 | Lepeska et al. |
| 10,764,402 | B2 | 9/2020 | Goel et al. |
| 10,902,080 | B2 | 1/2021 | Shribman et al. |
| 10,963,531 | B2 | 3/2021 | Shribman et al. |
| 11,153,265 | B1 | 10/2021 | Fayed et al. |
| 2002/0197978 | A1 | 12/2002 | Zavidniak |
| 2010/0254395 | A1 | 10/2010 | Smith et al. |
| 2011/0103393 | A1 | 5/2011 | Meier et al. |
| 2013/0179545 | A1 | 7/2013 | Bishop |
| 2013/0246508 | A1 | 9/2013 | Mccanne et al. |
| 2014/0281918 | A1 | 9/2014 | Wei et al. |
| 2015/0012608 | A1* | 1/2015 | Ishikawa ............... G06F 16/958 709/213 |
| 2015/0016248 | A1 | 1/2015 | Meier et al. |
| 2015/0067819 | A1 | 3/2015 | Shribman et al. |
| 2015/0134734 | A1 | 5/2015 | Bishop |
| 2016/0301546 | A1 | 10/2016 | Meier et al. |
| 2018/0026840 | A1 | 1/2018 | Toepke et al. |
| 2019/0116243 | A1 | 4/2019 | Shribman et al. |
| 2019/0132417 | A1 | 5/2019 | Shribman et al. |
| 2019/0182349 | A1 | 6/2019 | Goel et al. |
| 2019/0222667 | A1* | 7/2019 | Jaiswal ................... H04L 67/02 |
| 2019/0306263 | A1 | 10/2019 | Graham-Cumming |
| 2019/0349449 | A1 | 11/2019 | Shribman et al. |
| 2020/0351378 | A1 | 11/2020 | Shribman et al. |
| 2020/0356618 | A1 | 11/2020 | Shribman et al. |
| 2021/0067577 | A1 | 3/2021 | Shribman et al. |
| 2021/0194986 | A1 | 6/2021 | Shribman et al. |
| 2022/0182354 | A1 | 6/2022 | Fayed et al. |
| 2023/0088115 | A1* | 3/2023 | Krivit ................. H04L 67/5681 709/223 |

OTHER PUBLICATIONS

Barry Pollard, "Prerender pages in Chrome for instant page navigations", available online at <https://developer.chrome.com/docs/web-platform/prerender-pages>, Jun. 19, 2024, 30 pages.

Betts, Towards ever faster websites with early hints and priority hints, Fastly Inc., Jun. 13, 2018, 9 pages, downloaded at: https://www.fastly.com/blog/faster-websites-eariy-priority-hints.

Bilcke, 103 Early Hints, Jun. 30, 2018, 6 pages, downloaded at: https://evertpot.com/http/103-early-hints.

Final Office Action, U.S. Appl. No. 17/734,944, Aug. 18, 2023, 18 pages.

K. Oku, et al., An HTTP Status Code for Indicating Hints, Internet Engineering Task Force (IETF), Request for Comments: 8297, Dec. 2017, 7 pages.

K. Oku.Fastly., "An HTTP Status Code for Indicating Hints", Request for Comments: 8297, Dec. 2017, 7 pages.

Non-Final Office Action, U.S. Appl. No. 17/734,944, Apr. 3, 2023, 13 pages.

Notice of Allowance, U.S. Appl. No. 17/476,262, Jan. 5, 2022, 16 pages.

Notice of Allowance, U.S. Appl. No. 17/734,944, Feb. 29, 2024, 8 pages.

Nottingham, Beyond Server Push: experimenting with the 103 Early Hints Status Code, Fastly Inc., Nov. 4, 2020, 7 pages, downloaded at: https://www.fastly.com/blog/beyond-server-push-experimenting-with-the-103-eariy-hints-status-code.

Thomson et al., "RFC 9113 HTTP/2", Internet Engineering Task Force (IETF), RFC 9113, Jun. 2022, 78 pages.

Williams, Early Hints and HTTP/2 Push with Falcon, Feb. 10, 2019, 4 pages, downloaded at: https://www.codeotaku.com/journal/2019-02/falcon-eariy-hints/index.

* cited by examiner

210

```
{
  "prefetch": [{
    "source": "document",
    "where": {
      "and": [
        { "href_matches": "/*", "relative_to": "document" },
      ]
    },
    "eagerness": "conservative"
  }]
}
```

212 — {
214 — "prefetch": [{
216 — "href_matches": "/*"
218 — "relative_to": "document"
220 — "eagerness": "conservative"

FIG. 2

AUTOMATIC SPECULATION CONFIGURATION MANAGEMENT

FIELD

Embodiments of the invention relate to the field of network technology; and more specifically, to automatic speculation configuration management.

BACKGROUND

Prefetching refers to the practice of speculatively fetching resources in the background for pages that the user is likely to navigate to soon. This can significantly reduce the load time for the prefetched page if the user does choose to navigate to it. Prerendering is similar to prefetching. With prerendering, the content is prefetched and then rendered in the background by the browser as if the content had been rendered into an invisible separate tab. When the user navigates to the prerendered content, the current content is replaced by the prerendered content nearly instantly.

Traditionally prefetching has been accomplished using the <link rel="prefetch"> attribute as one of the resource hints. This requires developers to manually specify the attribute on each page for each resource they wanted the browser to preemptively fetch and cache in memory. This manual effort is laborious and developers often lack insight into what resources should be prefetched.

HTTP/2 server push is a feature of the HTTP/2 and HTTP/3 protocols that allows a server to send resources to a client before the client explicitly requests them. In practice, server push frequently results in wasted bandwidth because the server rarely knew which resources were already loaded by the client and transmits the same resource multiple times, resulting in slowdowns if the resources being pushed compete for bandwidth with resources which were requested. HTTP/2 Server Push is not a notification mechanism from server to client. Thus, the client has limited or no control over which resources are received.

An "early hints" status code is an informational HTTP status code in non-final HTTP responses that provides hints that certain resource(s) may appear in the final response. The 103 status code is designed to speed up overall page load times by giving the client an early signal that certain assets may appear in the final response. For instance, after receiving the 103 response, a client can start to fetch the resource(s) indicated in that response before the final HTTP response is received. During this time, the server may be compiling the final response including authenticating the request, making API calls, accessing a database, etc.

The Speculation Rules API allows developers to insert instructions into their pages or in a response header that informs the browser about which resources to prefetch or prerender. Conventionally these speculation rules must be defined by the developer. The developer can also specify when the speculations should be triggered with a value called an eagerness value.

SUMMARY

Automatic speculation configuration management is described. An intermediary server receives a request from a client. The resource is retrieved from the origin server, where the resource includes link(s) to other resource(s). The intermediary server generates and transmits a response that includes a header that references a speculation configuration for prefetching at least one of the other resource(s). The intermediary server receives a request for the speculation configuration from the client. The intermediary server generates and transmits a response to the client that includes the speculation configuration. The intermediary server receives a prefetching request from the client for one of the resources indicated in the speculation configuration, retrieves that resource, and transmits a response to the client with that resource.

BRIEF DESCRIPTION OF THE DRAWINGS

The invention may best be understood by referring to the following description and accompanying drawings that are used to illustrate embodiments of the invention. In the drawings:

FIG. 2 illustrates an example speculation configuration that specifies each URL that is linked in the page and is limited to same-site links.

DESCRIPTION OF EMBODIMENTS

An intermediary server receives a request from a client network application for a resource (e.g., an HTML page) that is served by an origin server. The intermediary server retrieves the resource from the origin server (e.g., transmits a request to the server and receives a response from the server with the content). The intermediary server generates a response to the request that includes a header that includes a reference to a configuration for speculatively prefetching and/or prerendering a set of one or more resources linked within the retrieved resource. The response also includes the retrieved resource. The intermediary server transmits the generated response to the client network application.

A machine learning model may be used for determining which resources linked in the resource are to be included in the speculation configuration. The predictions represent the next set of resources that are predicted to be accessed by a client network application based on the current resource. The machine learning model can take as input features that are generated from one or more of the following aggregate data sets: request data, performance data, cache data, and model validation data. The machine learning model may be used to determine a confidence value of the prediction that can be used to define a value in the speculation configuration that indicates when the client network application is to speculatively prefetch and/or prerender the set of one or more resources linked within the identified resource.

Unlike conventional speculation approaches that require developers to define and insert the configurations in the page or reference them in a response header, embodiments herein allow for the speculation configurations to be automatically generated and automatically included in the page or referenced in the response header. Further, the use of machine learning models to generate speculation hints results in more accurate predictions of which resources are likely to be requested next. This increases the efficiency of prefetching and/or prerendering, thereby reducing the waste of resources (e.g., bandwidth, memory, network resources) for incorrect prefetches.

Figure 1:
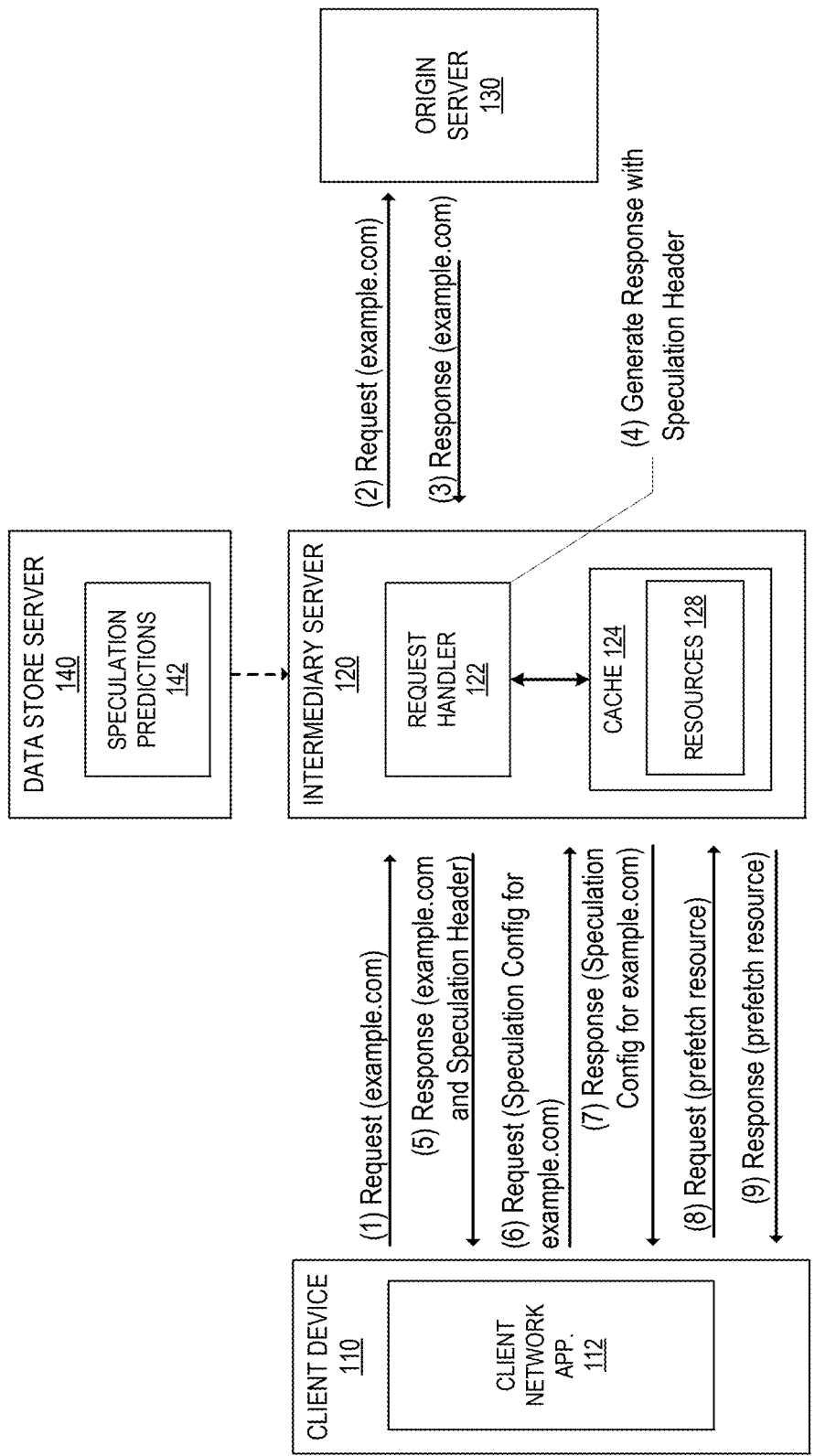
FIG. 1 illustrates an example of a system for automatic speculation configuration management according to an embodiment.

FIG. 1 illustrates an example of a system for automatic speculation configuration management according to an embodiment. The speculation configuration is provided to a client network application for speculatively prefetching and/or prerendering potential next pages. The system includes the intermediary server 120 that is situated between the client device 110 and the origin server 130. The intermediary server 120 may be a reverse proxy server. Certain network traffic is received and processed through the intermediary server 120. For example, web traffic (e.g., HTTP requests/responses, HTTPS requests/responses, SPDY requests/responses, etc.) for a domain handled by the origin server 130 may be received and processed at the intermediary server 120.

The client device 110 is a computing device (e.g., laptop, desktop, smartphone, mobile phone, tablet, gaming system, set top box, internet-of-things (IoT) device, wearable device, or other network device) that can transmit and receive network traffic. The client device 110 executes a client network application 112 such as a web browser or other application that can access network resources. The client network application 112 supports speculative prefetch and prerendering.

The origin server 130 is a computing device that serves and/or generates network resources (e.g., web pages, images, word processing documents, PDF files, movie files, music files, or other computer files). Although not illustrated in FIG. 1, the network resources handled by the origin server 130 may be stored separately from the device that responds to the requests.

The intermediary server 120 may be one of many servers of a distributed cloud computing network. Such a distributed cloud computing network can include multiple data centers that each have one or more intermediary servers. Each data center can also include one or more control servers, one or more DNS servers (e.g., one or more authoritative name servers, one or more proxy DNS servers), and/or one or more other pieces of network equipment such as router(s), switch(es), and/or hubs. Network traffic is received at the distributed cloud computing network from client devices such as the client device 110. The network traffic may be destined to a customer of the distributed cloud computing network and served by the origin server 130. The traffic may be received at the distributed cloud computing network in different ways. For instance, IP address(es) of the origin network belonging to the customer may be advertised (e.g., using Border Gateway Protocol (BGP)) by the distributed cloud computing network instead of being advertised by the origin network. As another example, the data centers of the distributed cloud computing network may advertise a different set of anycast IP address(es) on behalf of the origin and map those anycast IP address(es) to the origin IP address(es). This causes IP traffic to be received at the distributed cloud computing network instead of being received at the origin network. As another example, network traffic for a hostname of the origin network may be received at the distributed cloud computing network due to a DNS request for the hostname resolving to an IP address of the distributed cloud computing network instead of resolving to an IP address of the origin network. As another example, client devices may be configured to transmit traffic to the distributed cloud computing network. For example, an agent on the client device (e.g., a VPN client) may be configured to transmit traffic to the distributed cloud computing network. As another example, a browser extension or file can cause the traffic to be transmitted to the distributed cloud computing network. In any of the above scenarios, the network traffic from the client device 110 may be received at a particular data center that is determined to be closest to the client device 110 in terms of routing protocol configuration (e.g., Border Gateway Protocol (BGP) configuration) according to an anycast implementation as determined by the network infrastructure (e.g., router(s), switch(es), and/or other network equipment between the client device 110 and the datacenters) or by a geographical load balancer.

The data store server 140 may be a server in a distributed data store or a central server in a data store. The distributed data store may include a key-value store that is available at each data center of the distributed cloud computing network. The data store server 140 can store speculation predictions that are used by the intermediary server 120 for generating speculation configurations. The speculation configurations may be generated by a prediction service.

At operation 1, the request handler 122 of the intermediary server 120 receives a request from the client device 110 (e.g., an HTTP request) for a resource that is served by the origin server 130. The request is a GET request, for example. In the example of FIG. 1, the request is a GET request for the resource located at example.com (e.g., an HTML document). The intermediary server 120 processes the received request including retrieving the requested resource. The requested resource may be retrieved from cache if available. For instance, the intermediary server 120 can access the cache 124 to determine whether the requested resource is available in the cache 124. If the requested resource is available in cache 124 (e.g., in the resources 128), the intermediary server 120 retrieves the resource from the cache 124. If the requested resource is not cached in the cache 124, the intermediary server transmits a request for the resource to the origin server 130. Thus, at operation 2, the request handler 122 of the intermediary server 120 transmits a request for the resource to the origin server 130 (e.g., a GET request). The request handler 122 of the intermediary server 120 receives a response from the origin server 130 that includes the requested resource (the resource located at example.com) at operation 3. The response from the origin server 130 may or may not include a header that includes a reference to a configuration for speculatively prefetching and/or rendering a set of resource(s) linked within the resource.

At operation 4, the request handler 122 of the intermediary server 120 generates a response to the request that includes a header that includes one or more references to a configuration for speculatively prefetching and/or prerendering a set of one or more resources linked within the retrieved resource. This header is sometimes referred herein as a speculation header, and the configuration is sometimes referred herein as speculation configuration. The speculation header may be consistent with the Speculation-Rules header defined by the Speculation Rules API. The speculation header may include multiple references (e.g., one reference to a prefetch speculation configuration and another reference to a prerender speculation configuration).

In an embodiment, the intermediary server 120 respects any speculation rules that are applied to the resource by the origin server 130. For example, if the response from the origin server 130 includes a speculation header, the request handler 122 of the intermediary server 120 does not generate a speculation header. Instead, the speculation header included from the origin will be included in the response to the client network application. As another example, if the resource itself has a "speculationrules" script, the request handler 122 of the intermediary server 120 does not generate and transmit a speculation header to the client network application.

The request handler 122 of the intermediary server 120 transmits the response to the client network application 112 at operation 5. This response includes the requested resource (e.g., the document located at example.com) and the speculation header. When the client network application 112 begins parsing the response header, it will send a request for the speculation configuration as it loads the requested resource (the document located at example.com). Thus, at operation 6, the client network application 112 transmits a request for the speculation configuration included in the response header. In an embodiment, the request handler 122 generates the speculation configuration based on speculation predictions 142 that are retrieved from the data store server 140. The speculation predictions 142 include the probability of navigation for each next page from the current page as determined by a prediction service, which is described in greater detail herein. In another embodiment, the request handler 122 generates the speculation configuration without speculation predictions.

At operation 7 the request handler 122 of the intermediary server 120 transmits a response that includes the speculation configuration. The speculation configuration instructs the client network application to initiate prefetching requests and/or prerendering for future navigations.

The speculation configuration may be consistent with the Speculation Rules API. The speculation configuration may be a structure (e.g., a JSON structure). The speculation configuration indicates the type of speculation (e.g., prefetch or prerender). The speculation configuration can specify a list of URLs or use document rules with a "where" key in the configuration to allow speculation to be applied dynamically over the entire page. The speculation configuration can include a "relative_to" in the "where" clause to instruct the browser to limit speculation to same-site links, to avoid cross-origin speculation.

The speculation configuration can include a value that indicates when the client network application is to speculatively prefetch the resources indicated in the speculation configuration. This value is sometimes called an eagerness value. A first value, sometimes called immediate, indicates that the client network application is to speculatively prefetch the resources indicated in the speculation configuration without waiting for user interaction (generally as soon as the client network application processes the speculation configuration). A second value, sometimes called eager, indicates that the client network application is to speculatively prefetch like as defined by the first value but with an additional user interaction event such as moving the cursor towards the link. A third value, sometimes called moderate, indicates that the client network application is to speculative prefetch a resource responsive to the client network application detecting a pointer hovering over the corresponding link for a threshold amount of time (e.g., 200 ms); or on a pointer down event or touch down event. A fourth value, sometimes called conservative, indicates that the client network application is to speculatively prefetch a resource responsive to detecting a pointer down or touch down on the corresponding link.

In an embodiment, the speculation configuration specifies each URL that is linked (applied dynamically) and is limited to same-site links. FIG. 2 illustrates an example speculation configuration 210 that specifies each URL that is linked in the page and is limited to same-site links. The speculation configuration 210 indicates the type of speculation 212, which in this example is prefetching. The speculation configuration 210 uses document rules 214 and includes each link (through the wildcard 216) relative to the document 218. The speculation configuration 210 specifies a conservative eagerness value 220.

In an embodiment, the set of URL(s) that are included in the speculation configuration are determined using an adaptive machine learning model. The model generates a user traversal graph for each site based on same-site Referrer headers. For any two pages connected by a navigational hop, the model predicts the likelihood of a user moving between them. This model can be used to dynamically select the eagerness values to each relevant next page link on the site. For pages where the model predicts high confidence in user navigation, an aggressive eagerness value can be used (e.g., an immediate eagerness value). For pages where the model predicts less confidence in user navigation, a more conservative eagerness value can be used (e.g., a moderate eagerness value, a conservative eagerness value).

The speculation configuration guides the browser on when to prefetch the next likely page that may be navigated to. Unlike server-push where the server pushes the resource to the client network application, with speculation the client network application can determine not to follow the speculation configuration. For example, if the connection of the device is slow or metered, the client network application may avoid following speculation hints to conserve bandwidth. As another example, if the client device has limited processing power or memory, the client network application may not perform the speculation to conserve resources. As another example, if the client device is a battery-powered device, the client network application may not perform the speculation to conserve battery life, especially if in a power-saving mode. Similarly, if the client device is in a data saver mode, the client network application may not perform the speculation.

In the example of FIG. 1, the client network application 112 decided to make a prefetch request for one of the URLs indicated in the speculation configuration. If under a conservative eagerness, for example, this may have occurred when a user action such as a pointer down or touch down event has been detected on a link. Thus, at operation 8, the client network application 112 transmits a request for that corresponding resource to the intermediary server 120. This request can include a header that indicates the purpose of the link is for prefetching (e.g., a "sec-purpose: prefetch" request header).

The request handler 122 of the intermediary server 120 parses the request header and identifies it as a prefetch request. In an embodiment, the request handler 122 does not service a prefetch request for content that is not available in cache (e.g., the cache 124). This prevents pages that could negatively impact user experience from being prefetched. For example, prefetching a logout page may log the user out prematurely before the user wants to log out. The intermediary server 120 may apply cache rules to determine whether to cache a resource. For example, a resource may not be cached if the Cache-Control header is set to private, no-store, no-cache, or max-age=0; unless custom rules set by the customer overrides the caching behavior for specific URLs or paths (e.g., cache a resource that would otherwise not be cached based on the Cache-Control header). In such an embodiment, if the prefetch request is for content that is not present in the cache 124, the request handler 122 returns an error to the client network application 112 (e.g., a 503 HTTP status code). If the prefetch request is for content that is in the cache 124, the request handler 122 retrieves the content and returns it to the client network application 112. Thus, at operation 9, the request handler 122 transmits a response that includes the prefetched resource to the client network application 112.

After receiving the prefetched resource, the client network application 112 stores the content in memory (e.g., cache). If the user navigates to that page, the client network application 112 can load the webpage from the cache for immediate rendering.

Figure 3:
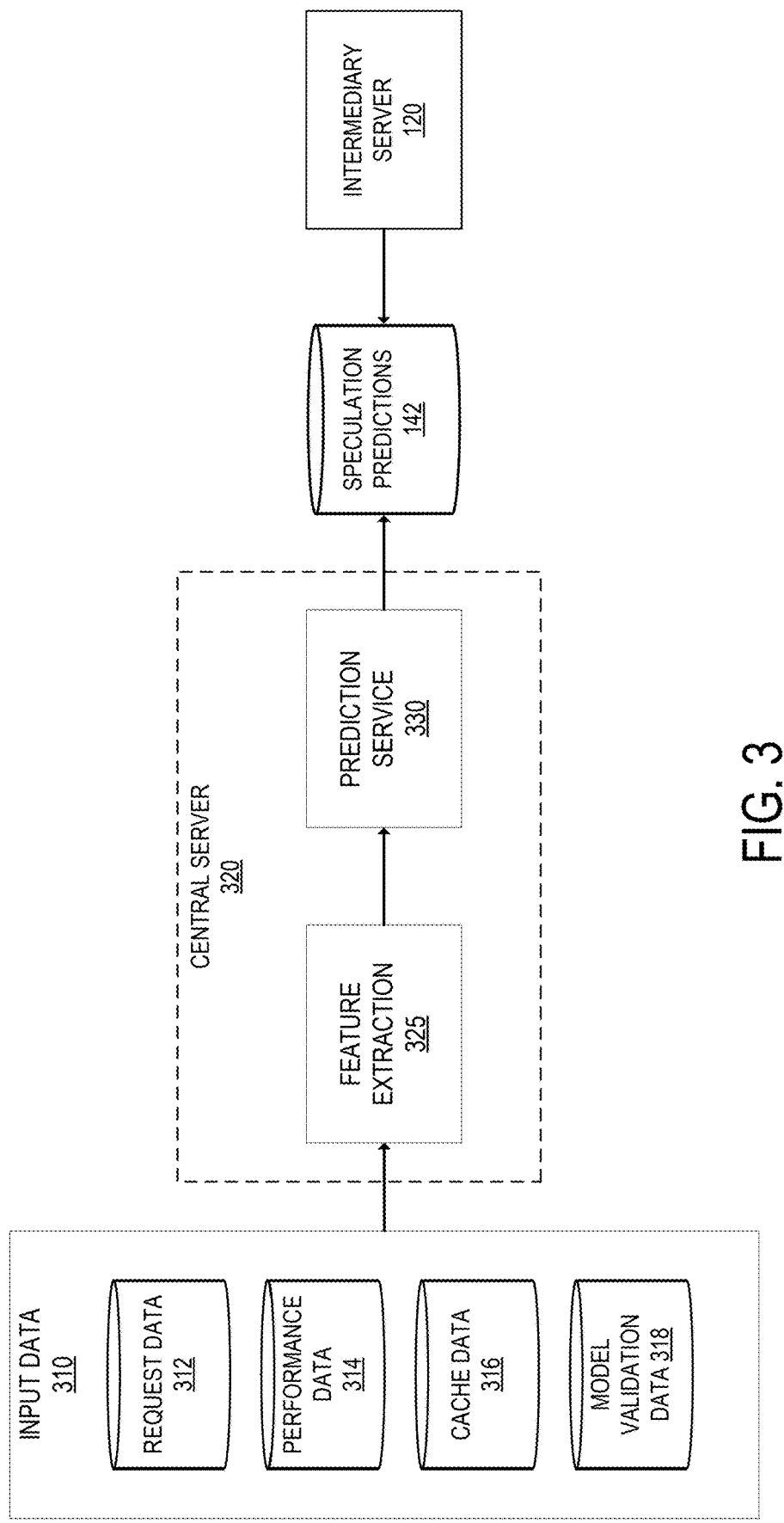
FIG. 3 shows an exemplary architecture for determining the set of URL(s) that are included in a speculation configuration according to an embodiment.

As previously described, in an embodiment the set of URL(s) that are included in the speculation configuration are determined using an adaptive machine learning model. FIG. 3 shows an exemplary architecture for determining the set of URL(s) that are included in a speculation configuration according to an embodiment. The prediction service follows a data driven approach and has access to a high volume aggregated data from many client network applications. These real traffic data sources can be combined in such a way that they reveal patterns or trends that can be used as signals for determining which set of resources a user will access next from the current resource.

The input data 310 includes one or more of: request data 312, performance data 314, cache data 316, model validation data 318, or any combination thereof. The request data 312 includes logged information about requests that are received at the distributed cloud computing network. The request data 312 includes data regarding successful requests for resources on a page (e.g., content-type HTML resources) that serves as a proxy for popularity or page views. This may include same-origin referrer information that provides information from one-hop navigations between two pages. The request data may include the cache-status of a page that indicates whether it is safe to prefetch or prerender a resource. Resources that cannot be cached at the distributed cloud computing network can be determined to be wasteful to be prefetched at the client side.

The performance data 314 provides page views and/or navigation insights. The performance data relies on referrer settings for identifying next page navigations.

The cache data 316 provides information about what content is eligible for speculation hints. Anything not in cache can be dynamic in nature that may cause side-effects if speculated by the client. A prefetch request that is received for a resource not in the cache data 316 may not be serviced.

The model validation data 318 provides speculation quality data which can be used to determine whether clients used the speculation hints. The model validation data 318 may be used as a feedback loop in iterative training of the model.

The feature extraction 325 generates feature embeddings from the input data 310 to input in the prediction service 330 (the model). The model can be a representation of a probability of navigation function given the current page URL and a next page URL. To say it another way, the model provides a probability of a user moving from the current page to another page connected by a navigational hop (a next page). Features are computed for each of the individual current page, the individual next page, and a combined source to destination referrer-based navigation.

For the features for the individual current page and the individual next page, the features are generated from only successful (status code 200) GET requests for HTML pages or documents for the hostname. For each of the individual current page and the individual next page, the features may include one or more of: the total number of requests to that page; the average size of the response for that page (e.g., in bytes); the size of the response for that page (e.g., in bytes); the standard deviation of the response size for that page (e.g., in bytes); the number of unique user agents requesting that page; the number of unique client Autonomous System Numbers (ASNs) for clients requesting that page, the average bot score for clients requesting that page, the median bot score for clients requesting that page, the standard-deviation bot score for clients requesting that page, the number of embedded HTML links on that page (computed by the number of unique hostname requests originated with the page URL as the referrer), or any combination thereof.

For the features for the combined source to destination referrer-based navigation, the features are generated only on requests that have a source URL in the referrer, are cacheable, and have a successful GET request to the destination URL. The source URL and the destination URL may be limited for the same hostname and may be limited to HTML content-type sources. The features computed for a referrer set to the source URL when visiting the destination URL include one or more of: the fraction of the number of requests to the destination URL divided by the number of requests to the source URL; the difference between the average size of the destination URL page and the average size of the source URL page; the number of unique user agents that have made requests for both the destination URL page and the source URL page; the number of unique client ASNs that have made requests for both the destination URL page and the source URL page; the difference between the average bot score of the destination URL page and the average bot score of the source URL page.

During learning, a random forest classifier and/or a CatBoost classifier may be used. The probability output of the model can be used to select the value of the eagerness attribute for speculation rules that are being returned. As an example, the eagerness attribute for a probability value of greater than a first threshold (e.g., 95%) can be set to immediate; an eagerness attribute for a probability value less than or equal to the first threshold but and above a second threshold (e.g., less than or equal to 95% but greater than 80%) can be set to eager; an eagerness attribute for a probability value less than or equal to the second threshold but above a third threshold (e.g., less than or equal to 80% but greater than 60%) can be set to moderate; and anything less than or equal to the third threshold can be set to conservative.

The feature extraction 325 periodically runs to generate the feature embeddings. For example, for each page of a hostname, the feature extraction 325 computes feature vectors for the current page and next page pairs, where next pages are determined using referrer headers set to the current page. As an alternative to using referrer headers to determine the next pages, the content of the page may be crawled to determine all next links.

The feature embeddings are then input into the prediction service 330 (the model), which generates the probability of navigation for each (current, next) pair of pages of the hostname. These probability values are included in the speculation predictions 142, which can be accessed by the intermediary server 120 as previously described.

In an embodiment, the request handler 122 can generate a speculation configuration with a prerendering hint for next page predictions that have a very high navigation probability (e.g., greater than a threshold), such as over 95%.

The feature extraction 325 and the prediction service 330 may be executed on a central server 320 or one or more servers. In some embodiments, the feature extraction 325 and the prediction service 330 are executed on a server within the same data center as the intermediary server 120.

Web page structure and user interaction can change over time. To keep the model up to date, the model may be iteratively trained with a feedback loop. The model validation data 318 provides speculation quality (a way of determining whether the clients used the speculation hints) as a feedback loop. The model validation data can be determined using a ping back mechanism. For example, for each GET request received that has a prefetch header (e.g., Sec-Purpose: prefetch), has a Referer header, and does not have a Referrer-Policy header that that is not set to "no-referrer" or "origin", the intermediary server 120 sends an HTTP response with a Link response header that includes a custom ping URL, where the custom ping URL includes information about the current page and the next page (found in the Referer header), along with a random token (a nonce) to make each request unique. The nonce ensures that the ping back URL is not cached by the client network application and allows for logging each navigation attempt individually. When the client network application navigates to the prefetched or prerendered document and renders it, the client network application will parse the Link header and issue a request for the custom ping URL. The intermediary server 120 receives this request, returns a No Content response (e.g., a 204 response), and logs that request. This information can be used to determine whether the speculation hints were accurate, by matching the predicted next pages with the actual user navigation. The speculation quality can be defined as the number of total current to next page ping requests divided by the number of total current to next page prefetch requests. If a particular current to next page pair has a speculation quality under a threshold can be set as not being helpful and may not be included in future speculation configurations or be included with a conservative eagerness value.

A goal for providing speculation hints to client network applications is improving page load times. Performance data may be used to determine whether smart speculations are improving page load times. The performance data may be collected via a client-side script that is inserted into the pages, and may include information such as the Largest Contentful Paint (LCP), First Input Delay (FID), and Cumulative Layout Shift (CLS). The performance data can also include metrics like page load time, time to first byte. In an embodiment, A/B testing is used to determine whether smart speculations are improving page load times. A set of URLs of hostname is set to use the speculation prediction feature (the experimental group) and another set of URLs of the hostname is not set to use the speculation prediction feature. Metrics are collected for a period and the performance data from before enablement of the smart speculation and after enablement is compared. The control group should not have any significant change in the performance data. The experimental group should show faster page load times when smart speculation is enabled as compared to when it was not enabled.

In an embodiment, the model may be location aware because the layout of a webpage may vary depending on the geographical region (e.g., changes in language). The model may be trained separately for separate locations such as for separate regions or countries, or for each data center.

In an embodiment, dynamic user-aware predictions are used to customize the speculation hints based on current user interaction. The user behavior on a particular page may be captured through one or more client-side scripts. For example, such script(s) may listen to mousemove events to capture the cursor's coordinates and predict whether the cursor is heading towards a particular link on the page. If the cursor moves near a particular link, the likelihood of that link being selected increases while the likelihood for other links being selected decreases. The user behavior information may be sent to the intermediary server 120 in real time. The intermediary server 120 executes a serverless script that uses this user behavior information and can dynamically rewrite the page to add or modify speculative hints to prefetch or prerender the predicted next page. Alternatively, the intermediary server 120 may include a client-side script in the page that responds to user behavior and can dynamically rewrite the page to add or modify speculative hints to prefetch or prerender the predicted next page.

Figure 4:
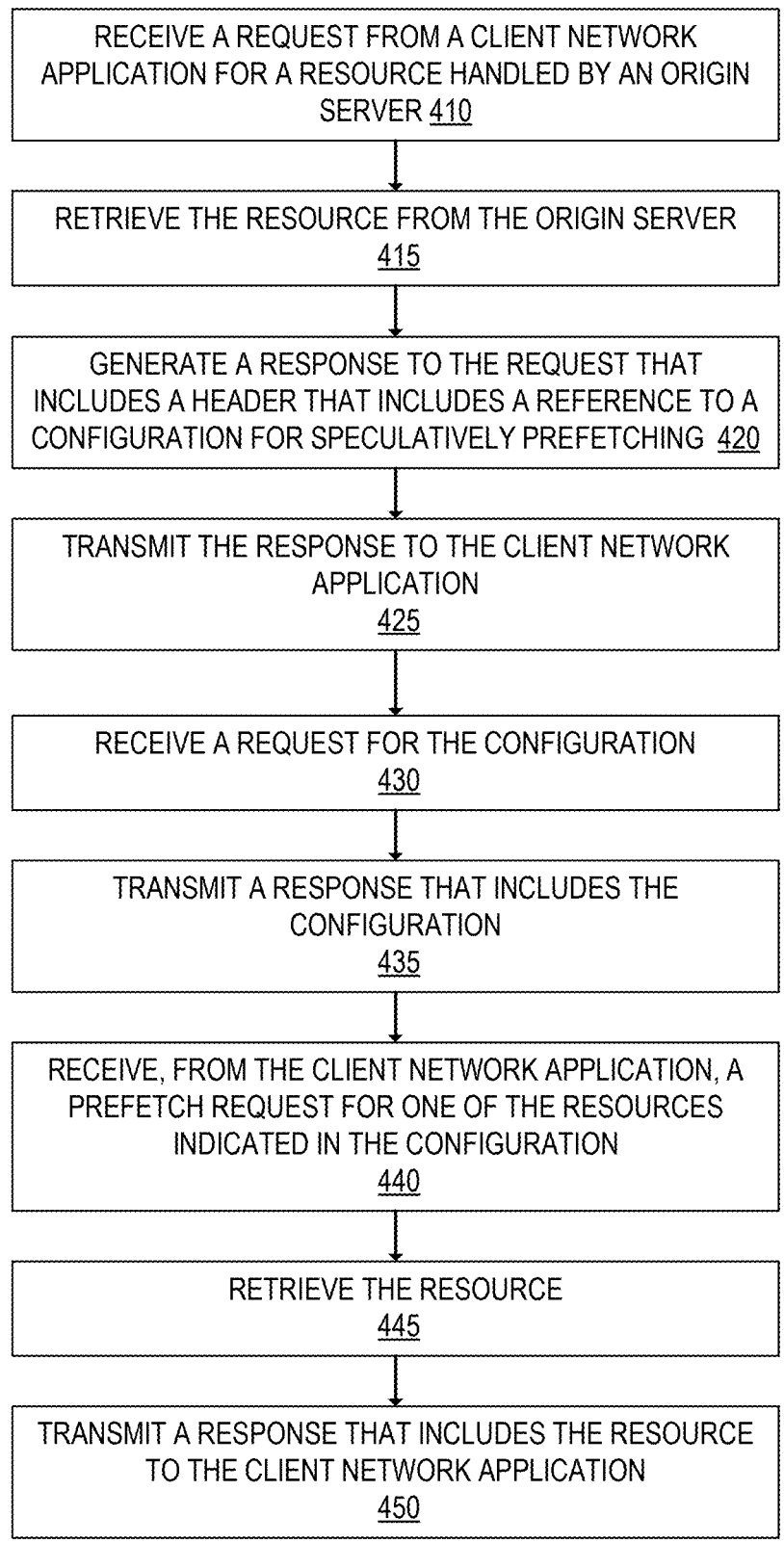
FIG. 4 is a flow diagram that illustrates exemplary operations for automatic speculation configuration management according to an embodiment.

FIG. 4 is a flow diagram that illustrates exemplary operations for automatic speculation configuration management according to an embodiment. The operations of FIG. 4 are described with respect to the exemplary embodiment shown in the other figures. However, the operations of FIG. 4 can be performed by different embodiments from that shown in the other figures, and the embodiments shown in the other figures can perform different operations from those in FIG. 4.

At operation 410, the intermediary server 120 receives a request from the client network application 112 for a resource that is handled by an origin server. The request may be a GET request. Next, at operation 415, the intermediary server 120 retrieves the resource from the origin server 130. Retrieving the resource can include the intermediary server 120 transmitting a request for the resource to the origin server 130 and receiving a response that includes the resource from the origin server 130. This response may include a header for speculatively prefetching. In an embodiment, if the response from the origin server 130 includes a header for speculatively prefetching, the intermediary server 120 does not include its own header for speculatively prefetching. Alternatively, if available in the cache 124, the intermediary server 120 can retrieve the resource from the cache 124. The retrieved resource includes one or more links to one or more other resources.

Next, at operation 420, the intermediary server 120 generates a response to the request. The generated response includes a header that includes a reference to a configuration for speculatively prefetching at least one of the resources that are linked within the retrieved resource. This header may be consistent with the Speculation-Rules header defined by the Speculation Rules API. The speculation header may include multiple references (e.g., one reference to a prefetch speculation configuration and another reference to a prerender speculation configuration). The generated response also includes the retrieved resource. The intermediary server 120 transmits the generated response to the client network application 112 at operation 425.

The client network application 112 receives the response and begins parsing the response header. It will send a request for the speculation configuration as it loads the requested resource. At operation 430, the intermediary server 120 receives a request for the configuration for speculatively prefetching from the client network application 112.

At operation 435, the intermediary server 120 generates and transmits a response that includes the speculation configuration to the client network application 112. In an embodiment, the intermediary server 120 generates the speculation configuration based on speculation predictions 142 that are retrieved from the data store server 140. The speculation predictions 142 include the probability of navigation for each next page from the current page as determined by a prediction service. In another embodiment, the request handler 122 generates the speculation configuration without speculation predictions. The speculation configuration included in the response includes at least one of the resources that are linked within the resource retrieved in operation 415.

The speculation configuration can include a value that indicates when the client network application 112 is to speculatively prefetch the resource(s) indicated in the configuration (e.g., the eagerness value). This can be: a value that indicates that the client network application 112 is to speculatively prefetch the resource(s) without waiting for user interaction; a value that indicates that the client network application 112 is to speculatively prefetch a resource responsive to detecting a pointer is hovered over a link for that particular resource for a threshold amount of time; or value that indicates that the client network application 112 is to speculatively prefetch a particular resource responsive to detecting a pointer down or touch down is made on a link for that particular resource. There may be different eagerness values for different resources referenced in the speculation configuration. The selection of the eagerness value can be made based on the probability output of the model. A higher probability output can have a more aggressive eagerness value compared to a lower probability output.

Sometime later, the client network application 112 determines to make a prefetch request for one of the URLs indicated in the speculation configuration. This determination may be based in part on the eagerness value(s) included in the speculation configuration. At operation 440, the intermediary server 120 receives a prefetch request for one of the resources indicated in the speculation configuration from the client network application 112. This request can include a header that indicates the purpose of the link is for prefetching (e.g., a "sec-purpose: prefetch" request header).

Next, at operation 445, the intermediary server 120 retrieves the resource that is being prefetched. In an embodiment, the intermediary server 120 does not service a prefetch request for content that is not available in cache (e.g., the cache 124). This prevents pages that could negatively impact user experience from being prefetched. The intermediary server 120 may apply cache rules to determine whether to cache a resource. For example, a resource may not be cached if the Cache-Control header is set to private, no-store, no-cache, or max-age=0; unless custom rules set by the customer overrides the caching behavior for specific URLs or paths (e.g., cache a resource that would otherwise not be cached based on the Cache-Control header). In such an embodiment, if the prefetch request is for content that is not present in the cache 124, the intermediary server 120 returns an error to the client network application 112 (e.g., a 503 HTTP status code). If the prefetch request is for content that is in the cache 124, the intermediary server 120 retrieves the content and returns it to the client network application 112. Thus, at operation 450, the intermediary server 120 transmits a response to the client network application 112 that includes the resource that is being prefetched. After receiving the prefetched resource, the client network application 112 stores the content in memory (e.g., cache). If the user navigates to that page, the client network application 112 can load the webpage from the cache for immediate rendering.

Figure 5:
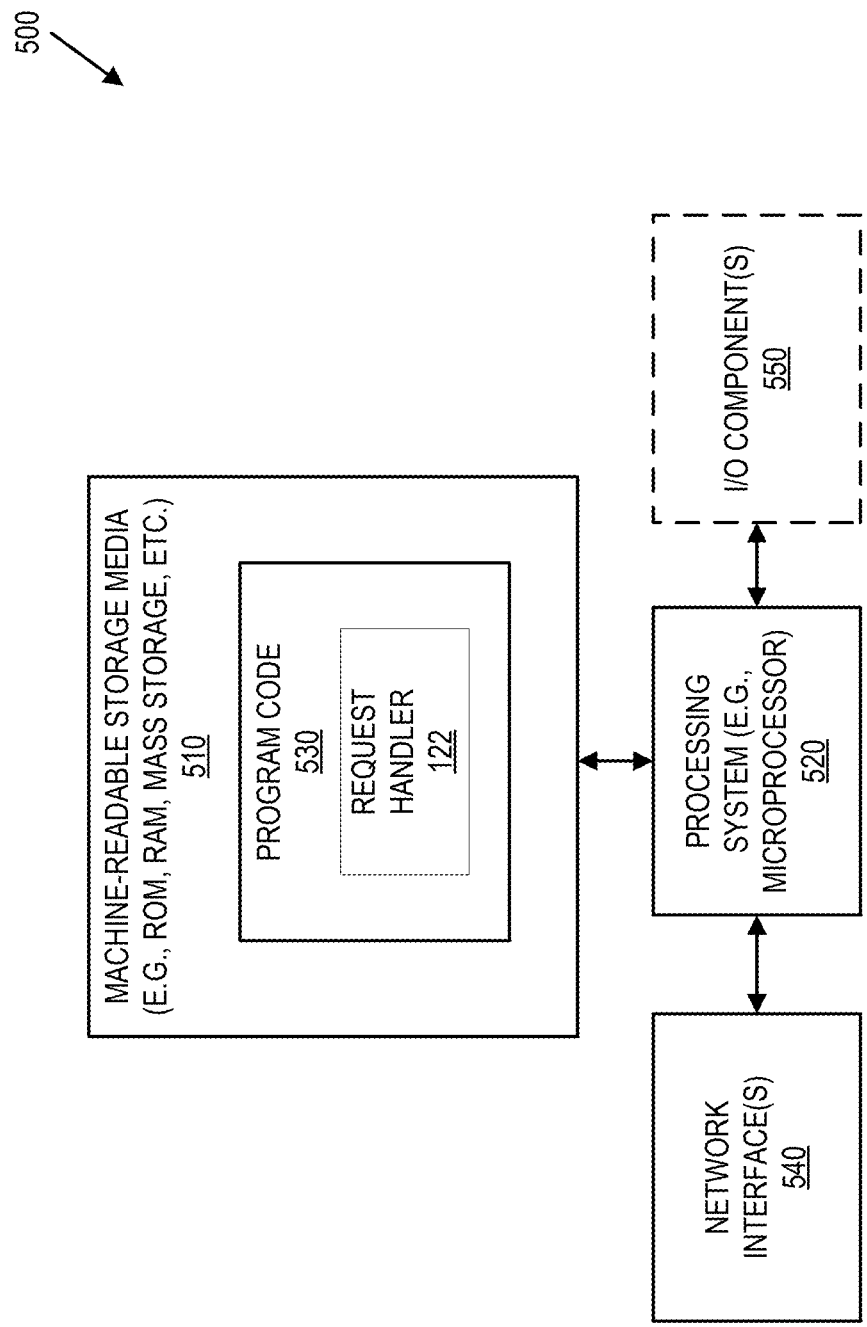
FIG. 5 is a block diagram illustrating a data processing system that can be used in an embodiment.

FIG. 5 illustrates a block diagram for an exemplary data processing system 500 that may be used in some embodiments. One or more such data processing systems 500 may be utilized to implement the embodiments and operations described with respect to the intermediary server 120 or other servers described herein. Data processing system 500 includes a processing system 520 (e.g., one or more processors and connected system components such as multiple connected chips).

The data processing system 500 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 510 (e.g., magnetic disks, optical disks, read only memory (ROM), flash memory devices, phase change memory) and machine-readable transmission media (also called a carrier) (e.g., electrical, optical, radio, acoustical or other form of propagated signals-such as carrier waves, infrared signals), which is coupled to the processing system 520. For example, the depicted machine-readable storage media 510 may store program code 530 that, when executed by the processing system 520, causes the data processing system 500 to execute the request handler 122, and/or any of the operations described herein.

The data processing system 500 also includes one or more network interfaces 540 (e.g., a wired and/or wireless interfaces) that allows the data processing system 500 to transmit data and receive data from other computing devices, typically across one or more networks (e.g., Local Area Networks (LANs), the Internet, etc.). The data processing system 500 may also include one or more input or output ("I/O") components 550 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 500, and, in certain embodiments, fewer components than that shown in One or more buses may be used to interconnect the various components shown in FIG. 5.

The techniques shown in the figures can be implemented using code and data stored and executed on one or more electronic devices (e.g., an intermediary server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals-such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

References in the specification to "one embodiment," "an embodiment," "an example embodiment," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
    receiving, at an intermediary server, a first request from a client network application that identifies a first resource that is handled by an origin server;
    retrieving the identified first resource from the origin server, wherein the retrieved first resource includes a set of one or more links to a set of one or more second resources respectively;
    generating a first response to the first request, wherein the generated first response includes a first header that includes a reference to a configuration for speculatively prefetching at least one of the set of second resources, and wherein the generated first response includes the retrieved first resource;
    transmitting the generated first response to the client network application;
    receiving, from the client network application, a second request for the configuration for speculatively prefetching at least one of the set of second resources;
    transmitting a second response to the client network application that includes the configuration for speculatively prefetching the at least one of the set of second resources;
    receiving, from the client network application, a third request for a third resource that corresponds to the at least one of the set of second resources indicated in the configuration, wherein the third request includes a second header that indicates that the third request is for prefetching the third resource;
    retrieving the third resource; and
    transmitting, to the client network application, a third response that includes the third resource.

2. The method of claim 1, wherein the configuration further includes a value that indicates when the client network application is to speculatively prefetch the at least one of the set of second resources.

3. The method of claim 2, wherein the value is one of:
    a first value that indicates that the client network application is to speculatively prefetch the at least one of the set of second resources without waiting for user interaction;
    a second value that indicates that the client network application is to speculatively prefetch a particular one of the at least one of the set of second resources responsive to detecting a pointer is hovered over a link for that particular one of the at least one of the set of second resources for a threshold amount of time; or
    a third value that indicates that the client network application is to speculatively prefetch a particular one of the at least one of the set of second resources responsive to detecting a pointer down or touch down is made on a link for that particular one of the at least one of the set of second resources.

4. The method of claim 1, further comprising:
    generating a probability of navigation from that first retrieved resource to each of the set of second resources;
    wherein prior to transmitting the configuration for speculatively prefetching the at least one of the set of second resources, determining the at least one of the set of second resources including considering the generated probability of navigation from the first retrieved resource to each of the set of second resources.

5. The method of claim 4, wherein generating the probability of navigation is done by a prediction service that operates on feature embeddings created from request logs, wherein the feature embeddings are computed for requests for the first retrieved resource, requests for each of the set of second resources, and a combined source to destination referrer-based navigation.

6. The method of claim 4, wherein the configuration further includes a value that indicates when the client network application is to speculatively prefetch the at least one of the set of second resources, wherein the value is based at least in part on the generated probability of navigation from the first retrieved resource to the at least one of the set of second resources.

7. The method of claim 1, wherein retrieving the identified first resource from the origin server includes:
    transmitting a fourth request that identifies the first resource to the origin server; and
    receiving a fourth response from the origin server that includes the identified first resource, wherein the second response does not include a header that includes a reference to configuration for speculatively prefetching.

8. A non-transitory computer-readable storage medium that, if executed by a processor of an intermediary server, will cause said intermediary server to perform operations, comprising:
    receiving a first request from a client network application that identifies a first resource that is handled by an origin server;
    retrieving the identified first resource from the origin server, wherein the retrieved first resource includes a set of one or more links to a set of one or more second resources respectively;

generating a first response to the first request, wherein the generated first response includes a first header that includes a reference to a configuration for speculatively prefetching at least one of the set of second resources, and wherein the generated first response includes the retrieved first resource;

transmitting the generated first response to the client network application;

receiving, from the client network application, a second request for the configuration for speculatively prefetching at least one of the set of second resources;

transmitting a second response to the client network application that includes the configuration for speculatively prefetching the at least one of the set of second resources;

receiving, from the client network application, a third request for a third resource that corresponds to the at least one of the set of second resources indicated in the configuration, wherein the third request includes a second header that indicates that the third request is for prefetching the third resource;

retrieving the third resource; and transmitting, to the client network application, a third response that includes the third resource.

9. The non-transitory computer-readable storage medium of claim 8, wherein the configuration further includes a value that indicates when the client network application is to speculatively prefetch the at least one of the set of second resources.

10. The non-transitory computer-readable storage medium of claim 9, wherein the value is one of:
a first value that indicates that the client network application is to speculatively prefetch the at least one of the set of second resources without waiting for user interaction;
a second value that indicates that the client network application is to speculatively prefetch a particular one of the at least one of the set of second resources responsive to detecting a pointer is hovered over a link for that particular one of the at least one of the set of second resources for a threshold amount of time; or
a third value that indicates that the client network application is to speculatively prefetch a particular one of the at least one of the set of second resources responsive to detecting a pointer down or touch down is made on a link for that particular one of the at least one of the set of second resources.

11. The non-transitory computer-readable storage medium of claim 8, wherein the operations further comprise:
generating a probability of navigation from that first retrieved resource to each of the set of second resources;
wherein prior to transmitting the configuration for speculatively prefetching the at least one of the set of second resources, determining the at least one of the set of second resources including considering the generated probability of navigation from the first retrieved resource to each of the set of second resources.

12. The non-transitory computer-readable storage medium of claim 11, wherein generating the probability of navigation is done by a prediction service that operates on feature embeddings created from request logs, wherein the feature embeddings are computed for requests for the first retrieved resource, requests for each of the set of second resources, and a combined source to destination referrer-based navigation.

13. The non-transitory computer-readable storage medium of claim 11, wherein the configuration further includes a value that indicates when the client network application is to speculatively prefetch the at least one of the set of second resources, wherein the value is based at least in part on the generated probability of navigation from the first retrieved resource to the at least one of the set of second resources.

14. The non-transitory computer-readable storage medium of claim 8, wherein retrieving the identified first resource from the origin server includes:
transmitting a fourth request that identifies the first resource to the origin server; and
receiving a fourth response from the origin server that includes the identified first resource, wherein the second response does not include a header that includes a reference to configuration for speculatively prefetching.

15. An intermediary server, comprising:
a processing system; and
a non-transitory machine-readable storage medium coupled to the processing system, wherein the non-transitory machine-readable storage medium stores instructions that, when executed by the processing system, causes the intermediary server to perform operations including:
receiving a first request from a client network application that identifies a first resource that is handled by an origin server,
retrieving the identified first resource from the origin server, wherein the retrieved first resource includes a set of one or more links to a set of one or more second resources respectively,
generating a first response to the first request, wherein the generated first response includes a first header that includes a reference to a configuration for speculatively prefetching at least one of the set of second resources, and wherein the generated first response includes the retrieved first resource,
transmitting the generated first response to the client network application,
receiving, from the client network application, a second request for the configuration for speculatively prefetching at least one of the set of second resources,
transmitting a second response to the client network application that includes the configuration for speculatively prefetching the at least one of the set of second resources,
receiving, from the client network application, a third request for a third resource that corresponds to the at least one of the set of second resources indicated in the configuration, wherein the third request includes a second header that indicates that the third request is for prefetching the third resource,
retrieving the third resource, and
transmitting, to the client network application, a third response that includes the third resource.

16. The intermediary server of claim 15, wherein the configuration further includes a value that indicates when the client network application is to speculatively prefetch the at least one of the set of second resources.

17. The intermediary server of claim 16, wherein the value is one of:

a first value that indicates that the client network application is to speculatively prefetch the at least one of the set of second resources without waiting for user interaction;

a second value that indicates that the client network application is to speculatively prefetch a particular one of the at least one of the set of second resources responsive to detecting a pointer is hovered over a link for that particular one of the at least one of the set of second resources for a threshold amount of time; or a third value that indicates that the client network application is to speculatively prefetch a particular one of the at least one of the set of second resources responsive to detecting a pointer down or touch down is made on a link for that particular one of the at least one of the set of second resources.

18. The intermediary server of claim 15, wherein the operations further comprise:

generating a probability of navigation from that first retrieved resource to each of the set of second resources;

wherein prior to transmitting the configuration for speculatively prefetching the at least one of the set of second resources, determining the at least one of the set of second resources including considering the generated probability of navigation from the first retrieved resource to each of the set of second resources.

19. The intermediary server of claim 18, wherein generating the probability of navigation is done by a prediction service that operates on feature embeddings created from request logs, wherein the feature embeddings are computed for requests for the first retrieved resource, requests for each of the set of second resources, and a combined source to destination referrer-based navigation.

20. The intermediary server of claim 18, wherein the configuration further includes a value that indicates when the client network application is to speculatively prefetch the at least one of the set of second resources, wherein the value is based at least in part on the generated probability of navigation from the first retrieved resource to the at least one of the set of second resources.

21. The intermediary server of claim 15, wherein retrieving the identified first resource from the origin server includes:

transmitting a fourth request that identifies the first resource to the origin server; and receiving a fourth response from the origin server that includes the identified first resource, wherein the second response does not include a header that includes a reference to configuration for speculatively prefetching.

* * * * *